(12) United States Patent
Trundle et al.

(10) Patent No.: US 10,748,362 B2
(45) Date of Patent: Aug. 18, 2020

(54) MONITORING SYSTEM FOR MONITORING UNATTENDED SERVICES

(71) Applicant: Alarm.com Incorporated, Tysons, VA (US)

(72) Inventors: Stephen Scott Trundle, Falls Church, VA (US); Aaron Lee Roberts, Centreville, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/371,941

(22) Filed: Apr. 1, 2019

(65) Prior Publication Data

US 2019/0304228 A1 Oct. 3, 2019

(51) Int. Cl.
| | |
|---|---|
| *G08B 13/00* | (2006.01) |
| *G07C 9/00* | (2020.01) |
| *G08B 13/196* | (2006.01) |
| *G06Q 10/06* | (2012.01) |
| *G06Q 10/08* | (2012.01) |
| *G06Q 50/16* | (2012.01) |

(52) U.S. Cl.
CPC ..... *G07C 9/00563* (2013.01); *G06Q 10/0631* (2013.01); *G06Q 10/0833* (2013.01); *G06Q 50/163* (2013.01); *G08B 13/00* (2013.01); *G08B 13/196* (2013.01)

(58) Field of Classification Search
None
See application file for complete search history.

(56) References Cited

U.S. PATENT DOCUMENTS

2004/0084526 A1 5/2004 Knowles et al.

FOREIGN PATENT DOCUMENTS

WO 2018005976 1/2018

OTHER PUBLICATIONS

PCT International Search Report and Written Opinion in International Application No. PCT/US2019/025178, dated Jun. 11, 2019, 12 pages.

*Primary Examiner* — Adolf Dsouza
(74) *Attorney, Agent, or Firm* — Fish & Richardson P.C.

(57) ABSTRACT

Methods, systems, and apparatus, including computer programs encoded on a storage device, for accommodating unattended services at a property. In one aspect, a monitoring system is disclosed that includes a processor and a storage device storing instructions that, when executed by the processor, cause the processor to perform operations. The operations can include receiving a request to enter the property to perform the unattended service, configuring the monitoring system to allow access to a first portion of the property associated with the unattended service without triggering an alarm event, obtaining image data of the property after the monitoring system is configured to allow access to the first portion of the property, determining, based on the obtained image data, that an unattended service provider has entered into a second, different portion of the property, and triggering an alarm event.

20 Claims, 6 Drawing Sheets

200

```
┌─────────────────────────────────────────────────────────┐
│  ACCESS A THREE-DIMENSIONAL MAP OF A PROPERTY           │
│                                                     210 │
└─────────────────────────────────────────────────────────┘
                              │
                              ▼
┌─────────────────────────────────────────────────────────┐
│  ACCESS A SERVICE PROFILE THAT DEFINES (I) A SERVICE    │
│  TYPE AND (II) ONE OR MORE PORTIONS OF THE PROPERTY     │
│  THAT ARE ASSOCIATED WITH THE SERVICE TYPE          220 │
└─────────────────────────────────────────────────────────┘
                              │
                              ▼
┌─────────────────────────────────────────────────────────┐
│  ACCESS CAMERA CONFIGUREATION DATA FOR EACH CAMERA      │
│  OF ONE OR MORE CAMERAS INSTALLED AT THE PROPERTY       │
│                                                     230 │
└─────────────────────────────────────────────────────────┘
                              │
                              ▼
┌─────────────────────────────────────────────────────────┐
│  DETERMINE, BASED ON THE THREE-DIMENSIONAL MAP, THE     │
│  SERVICE PROFILE, AND THE CAMERA SPECIFICATION DATA,    │
│  WHETHER CURRENT PLACEMENT OF THE ONE OR MORE CAMERAS IS│
│  SUFFICIENT TO MONITOR THE ONE OR MORE PORTIONS OF THE  │
│  PROPERTY THAT ARE ASSOCIATED WITH THE SERVICE TYPE     │
│                                                     240 │
└─────────────────────────────────────────────────────────┘
                              │
                              ▼
┌─────────────────────────────────────────────────────────┐
│  PROVIDING OUTPUT DATA FOR CONSUMPTION BY A USER THAT   │
│  PROVIDES AN INDICATION OF THE LEVEL OF SUFFICIENCY     │
│  ASSOCIATED WITH THE CURRENT CAMERA PLACEMENT FOR THE   │
│  SERVICE TYPE                                       250 │
└─────────────────────────────────────────────────────────┘
```

```
┌─────────────────────────────────────────────────────┐
│   RECEIVING A REQUEST TO ENTER A PROPERTY      510  │
└─────────────────────────────────────────────────────┘
                         │
                         ▼
┌─────────────────────────────────────────────────────┐
│   DETERMINING, BASED ON THE RECEIVED REQUEST, A     │
│   PARTICULAR TYPE OF SERVICE THAT IS TO BE          │
│   PERFORMED BY THE UNATTENDED SERVICE PROVIDER  520 │
└─────────────────────────────────────────────────────┘
                         │
                         ▼
┌─────────────────────────────────────────────────────┐
│   ACCESSING A SERVICE PROFILE BASED                 │
│   ON THE PARTICULAR TYPE OF SERVICE            530  │
└─────────────────────────────────────────────────────┘
                         │
                         ▼
┌─────────────────────────────────────────────────────┐
│   DYNAMICALLY CONFIGURE THE MONITORING SYSTEM,      │
│   BASED ON THE ACCESSED SERVICE PROFILE, TO ALLOW   │
│   ACCESS TO ONE OR MORE PORTIONS OF THE PROPERTY    │
│   TO AN UNATTENDED SERVICE PROVIDER            540  │
└─────────────────────────────────────────────────────┘
                         │
                         ▼
┌─────────────────────────────────────────────────────┐
│   OBTAINING IMAGE DATA OF THE ONE OR MORE PORTIONS  │
│   OF THE PROPERTY ASSOCIATED WITH THE PARTICULAR    │
│   TYPE OF SERVICE                              550  │
└─────────────────────────────────────────────────────┘
                         │
                         ▼
┌─────────────────────────────────────────────────────┐
│   DETERMINING, BASED ON THE IMAGE DATA, THAT THE    │
│   SERVICE PROVIDER HAS CROSSED A BOUNDARY THAT IS   │
│   ASSOCIATED WITH THE ONE OR MORE PORTIONS OF THE   │
│   PROPERTY ASSOCIATED WITH THE PARTICULAR TYPE      │
│   OF SERVICE                                   560  │
└─────────────────────────────────────────────────────┘
                         │
                         ▼
┌─────────────────────────────────────────────────────┐
│   IN RESPONSE TO DETERMINING, BASED ON THE IMAGE    │
│   DATA, THAT THE SERVICE PROVIDER HAS CROSSED A     │
│   BOUNDARY THAT IS ASSOCIATED WITH THE ONE OR MORE  │
│   PORTIONS OF THE PROPERTY ASSOCITED WITH THE       │
│   PARTICULAR TYPE OF SERVICE, TRIGGERING AN ALARM   │
│   EVENT                                        570  │
└─────────────────────────────────────────────────────┘
```

FIG. 5

MONITORING SYSTEM FOR MONITORING UNATTENDED SERVICES

CROSS-REFERENCE TO RELATED APPLICATIONS

This application claims the benefit of the U.S. Provisional Patent Application No. 62/651,068 filed Mar. 30, 2018 and entitled "Monitoring System For Monitoring Unattended Services," which is incorporated herein by reference in its entirety.

BACKGROUND

The offering of unattended services is on the rise. Unattended service include any service that is performed at a property when a resident of the property is not present at the property. Such unattended services may include services such as in-home delivery of goods purchased online, plumbing services, HVAC maintenance services, property cleaning services, home repair services, or the like.

SUMMARY

According to one innovative aspect of the present disclosure, a monitoring system for accommodating unattended service at a property is disclosed. In one aspect, the monitoring system can include one or more processors and one or more storage devices storing instructions that, when executed by the one or more processors, cause the one or more processors to perform operations. In some implementations, the operations can include receiving a request to enter the property to perform the unattended service, based on the received request to enter the property to perform the unattended service, configuring the monitoring system to allow access to a first portion of the property associated with the unattended service without triggering an alarm event, obtaining image data of the portion of the property after the monitoring system is configured to allow access to the first portion of the property associated with the unattended service, determining, based on the obtained image data, that an unattended service provider has entered into a second, different portion of the property other than the first portion of the property that is associated with the unattended service, and in response to determining, based on the obtained image data, that the service provider entered into the second, different portion of the property other than the first portion of the property that is associated with the unattended service, triggering an alarm event.

Other aspects include corresponding methods, apparatus, and computer programs to perform actions of methods defined by instructions encoded on computer storage devices.

These and other versions may optionally include one or more of the following features. For instance, in some implementations, triggering the alarm event can include (i) transmitting a first message to a speaker device that, when processed by the speaker device, causes the speaker device to output an audible alarm or (ii) transmitting a second message to another component of the monitoring system, the second message comprising information indicating that the unattended service provider entered the second, different portion that is different than the first portion of the property.

In some implementations, the first portion of the property is defined using one or more boundaries. In such implementations, determining, based on the obtained image data, that the unattended service provider has entered into the second, different portion of the property than the first portion of the property that is associated with the unattended service can include determining, based on the obtained image data, whether the service provider has crossed the one or more of the boundaries. In addition, in response to determining, based on the obtained image data, that the service provider entered into the second, different portion of the property other than the first portion of the property that is associated with the unattended service, triggering an alarm event can include in response to determining, based on the obtained image data, that the unattended service provider has crossed the one or more boundaries, triggering an alarm event.

In some implementations, the one or more boundaries define a path from an entrance of the property to a particular location within the property that is associated with the unattended service.

In some implementations, the operations can include receiving data describing an unattended service to be performed, determining, based on the received request, a particular type of unattended service that is to be performed by the unattended service provider, and accessing a stored service profile based on the particular type of unattended service. In such implementations, configuring the monitoring system can include configuring the monitoring system using information included in the stored service profile.

In some implementations, configuring the monitoring system to allow access to the first portion of the property associated with the unattended service without triggering an alarm event can include identifying one or more sensors that are used by the monitoring system to monitor the first portion of the property associated with the unattended service, and configuring the monitoring system to disregard sensor data generated by the one or more sensors of the monitoring system that are configured to monitor the first portion of the property associated with the unattended service for a predetermined amount of time.

In some implementations, the one or more sensors include a motion sensor, a contact sensor, or a glass break sensor.

In some implementations, configuring the monitoring system to allow access to the first portion of the property associated with the unattended service without triggering an alarm event can include identifying one or more doors of the property that need to be unlocked to facilitate access to the first portion of the property associated with the unattended service and instructing the identified one or more doors to unlock or open without triggering an alarm event.

In some implementations, configuring the monitoring system to allow access to the first portion of the property associated with the unattended service without triggering an alarm event can include identifying one or more doors of the property that need to be unlocked to facilitate access to the first portion of the property associated with the unattended service, and transmitting a message to a user device of the unattended service provider, the message including a code that, when input into a control pad of a lock of at least one of the identified one or more doors, causes the identified one or more doors to unlock or open without triggering an alarm event.

In some implementations, the operations can further include providing, to a user device of the unattended service provider, data that, when rendered by the user device, causes the user device to render display data on a display of the user device that describes a layout of the property, wherein display data indicates the first portion of the property associated with the unattended service that the unattended service provider is allowed to access.

In some implementations, the display data includes data describing one or more boundaries of the first portion of the property that, if crossed by the unattended service provider, result in an alarm event being triggered by the monitoring system.

In some implementations, the unattended service includes a service performed by a non-resident person or non-resident machine during a period of time when no resident of the property is located at the property.

These and other features of the present disclosure are further described below in the corresponding detail description, the claims, and the accompanying drawings.

BRIEF DESCRIPTION OF THE DRAWINGS

FIG. 2 is a flowchart of a process for optimizing placement of cameras for monitoring unattended services.

FIG. 5 is a flowchart of a process that can be performed by a monitoring system to monitor unattended services.

DETAILED DESCRIPTION

The subject matter of the present disclosure is directed towards a monitoring system for monitoring unattended services such as in-home deliveries that occur when resident of the property is not present at the property. The monitoring system for monitoring unattended services provided by the present disclosure may generally provide different levels of functionality.

In one aspect, the monitoring system may perform one or more operations to optimize camera placement at a property that can be used to monitor unattended services. For example, the present disclosure can analyze property profiles defining portions of a property that are accessible for a particular service type and camera specification data in view of a three-dimensional map of the property to determining whether portions of a property associated with a particular service can be captured within the field-of-view of the cameras currently installed at the property. Based on this analysis, the monitoring system can generate recommendations regarding the placement of existing cameras, addition of one or more additional cameras, or a combination thereof in order to ensure that sufficient coverage of a portion of the property associated with a particular service type is achieved.

In another aspect, the monitoring system may perform active monitoring of a property during an unattended service. For example, the monitoring system may be configured to detect a request for access to the property from a service provider. The monitoring system may then determine, based on the request, a type of unattended service that is to be performed by the service provider. Then, the monitoring system may dynamically adjust the configuration of the monitoring system to allow the service provider to perform the unattended service without triggering a false alarm. For example, the monitoring system may temporarily disable (or temporarily disregard sensor data from) sensors installed in a portion of the property associated with the unattended service to be performed by the service provider. This may include, for example, disabling (or disregarding sensor data from) one or more motions sensors installed at the property that are configured to detect movements in portions of the property associated with the unattended service to be performed by the service provider.

Alternatively, or in addition, the monitoring system may analyze image data obtained from cameras installed within the property to determine whether the service provider crosses a boundary that defines one or more portions of the property associated with the service. In response to a determination that the service provider crosses the boundary, the monitoring system trigger an alarm event. Triggering of an alarm event may include, for example, transmitting a notification to a central alarm station server that notifies a central station operator of the potential occurrence of a security breach at the property.

Figure 1:
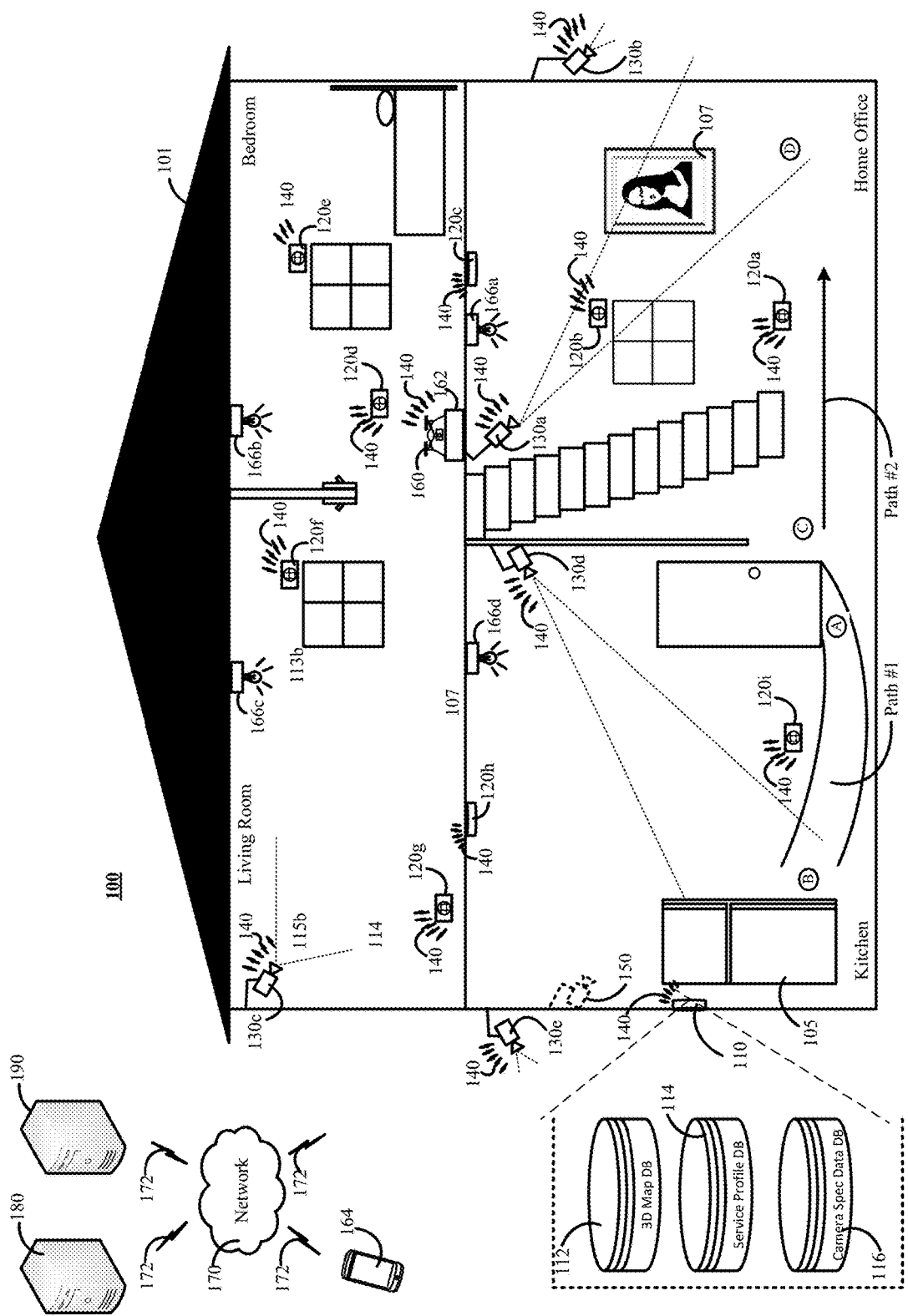
FIG. 1 is a contextual diagram of a monitoring system for monitoring system that optimizes placement of cameras for monitoring unattended services.

FIG. 1 is a contextual diagram of a monitoring system for monitoring system that optimizes placement of cameras for monitoring unattended services. The monitoring system 100 includes at least a monitoring system control unit 110, one or more sensors 120*a*, 120*b*, 120*c*, 120*d*, 120*e*, 120*f*, 120*g*, 120*h*, 120*i* (hereinafter "120*a* to 120*i*"), one or more cameras 130*a*, 130*b*, 130*c*, 130*d*, 130*e* (hereinafter "130*a-e*"), and a network 140. The local network 140 may include a LAN, a WAN, a cellular network, a Z-wave network, a ZigBee network, a Bluetooth network, a HomePlug network, the Internet, or a combination thereof. The local network 140 may include wired components, wireless components, or a combination thereof. For example, the network 140 may include a fiber optic network, an Ethernet network, a Wi-Fi network, or a combination thereof. In some implementations, the monitoring system 100 may also include a drone 160, a wireless charging station 162, a user device 164, a remote network 170, one or more communication links 172, a monitoring application server 180, a central alarm station server, or a combination thereof.

The sensors 120*a* to 120*i* may include any type of sensor that can sense an attribute associated with the property 101 and generate sensor data that describes the sensed attributes. The sensors 120*a* to 120*i* may include one or more of a motion sensor, a contact sensor, a glass break sensor, as smoke detector, a temperature sensor, or the like. Each of the one or more sensors 120*a* to 120*i* can be configured to broadcast the sensor data describing the sensed attributes. The monitoring system control unit 110 (or monitoring application server 180) can detect the sensor data describing the sensed attribute and perform one or more operations. For example, in response to the detection of the sensor data describing the sensed attribute, the monitoring system control unit 110 may trigger an alarm event. In such instances, the monitoring system control unit 110 may trigger an audible alarm, visual alarm, silent alarm, or a combination thereof, and transmit a notification to a central alarm station server 190 that notifies the central alarm station server of the detected alarm event. In some implementations, the monitoring system control unit 110 may be configured to disregard sensor data from one or more sensors 120*a* to 120*i* based on a determination that an unattended service is being performed in a portion of the property 101 that is associated with the sensor.

The one or more cameras 130*a* to 130*e* are configured to obtain image data representing one or more portions of the property 100. The one or more cameras 130*a* to 130*e* may be configured to wireless transmit obtained images to the monitoring system control unit 110 or monitoring application server 180 for analysis via the local network 140, the remote network 170, one or more communication links 172, or a combination thereof. Alternatively, each respective camera 130a to 130e may be configured to analyze obtained image data as described with reference to the monitoring system control unit 110 below. Image data may include still image data, video image data, or a combination thereof.

The monitoring system control unit 110 is configured to optimize camera placement within the property 101. Optimizing camera placement may include, for example, analyzing the placement of one or more cameras installed at the property in view of a map of particular portions of the property that are associated with one or more respective unattended service types. In some implementations, the monitoring system control unit 110 can be configured to analyze the map of a particular portion of a property to recommend camera placement even in situations where no camera is currently installed at the property 101.

Though a monitoring system control unit 110 is described as being configured to optimize camera placement within a property 101, the present disclosure need not be so limited. For example, the same operations described in this specification as being performed by the monitoring system control unit 110 that is local to the property 101 may also be performed by the monitoring application server 180, one or more of the cameras 130a to 130e installed at the property 101, or a combination of one or more of the monitoring system control unit 110, the monitoring application server 180, the one or more cameras 130a to 130e, or a combination thereof. By way of another example, the same operations described herein as being performed by the monitoring system control unit 110 to optimize camera placement may also be performed by a user device 164, a virtual reality headset, an augmented reality headset, or the like.

The monitoring system control unit 110 may optimize camera placement at the property 101 by analyzing data maintained in a service profile database 114 and a camera specification data database 116 in view of a three-dimensional map of the property 101 that is stored in a map database 112. In some implementations, the three-dimensional map database 112, service profile database 114, and camera specification database 116 are stored by the monitoring system control unit 110. In other implementations, the three-dimensional map database 112, service profile database 114, and camera specification database 116 are stored on a remote platform such as the monitoring application server 180 and may be accessed by the monitoring system control unit 110 via one or more networks.

The service profile database 114 may store one or more service profiles associated with the property. A service profile may include a data structure that conceptually organizes stored data describing a particular unattended service and a particular portion of the property 101 that is associated with the service. By way of example, a particular unattended service may include the delivery of groceries when a resident of the property 101. In such instances, an example of a particular portion of the property 101 that may be associated with the unattended grocery delivery service may include a path such as Path #1 that extends from the door to the refrigerator 105 that is in the kitchen of the property 101. However the present disclosure need not be so limited.

For example, a service profile may identify different types of unattended services such as plumbing, housekeeping services, HVAC services, or the like. The service profiles are also not limited to only identifying a path through the property 101. For example, in some implementations, a more general portion of the property may be associated with the unattended service identified by a service profile. For example, for an unattended cleaning service, a service profile may indicate that the service provider of the unattended delivery service has access to the kitchen, living room, and bedroom—but no access to the Home Office.

A resident of a property may use a user device 164 to generate service profiles for unattended services that the resident wants to register with the monitoring system 100. Generating a service profile may include creating an unattended service type identifier that can be associated with service profile to identify the unattended service. The unattended service type identifier may include a name such as "grocery delivery."

In addition, generating a service profile also includes the resident inputting data that defines the portions of the property 101 that should be accessible by the service provider while the service provider provides the unattended service. The portions of the property 101 that should be accessible to a service provider that is providing an unattended service may include, for example, a room of the property 101, portion of the property 101 that is only a subset of a room, a path through the property 101, or the like. In some implementations, a resident user of a user device 164 may input the portion of the property 101 that is accessible to the service provider that is providing an unattended service by inputting the textual description of the name of a room such as "kitchen."

In some implementations, the resident user may access a three-dimensional map of the property 101 and use a pointing device such as a stylus or their finger, to make marks on the display of the user device 164 that identify portions of the property 101 that are to be accessible to the service provider that is providing an unattended delivery service. For example, the resident user may draw a path through the property 101 that should be accessible to the service provider when providing the unattended service. Alternatively, the user can use the pointing device to select rooms that should be accessible to the service provider. For example, a resident user may create a service profile for a house cleaning service. In such instances, the resident user may select the bedroom, living room, and kitchen for cleaning—but not the home office. Such selections may indicate that the maid providing the cleaning service is allowed to access the bedroom, living room, and kitchen without triggering an alarm. However, the maid may trigger an alarm if the maid enters the home office.

In either scenario inverse property designations may also be made. For example, the resident user may input the name of a portion of a property or use the pointing device to access a portion of the property that the resident user would like to deny access to. In such instances, with reference to the house cleaning example, the resident user may be able to merely select the home office as a place that the resident user does not want the maid to enter. Thus, the maid will have access to the entire property without triggering an alarm except for the home office. If the service provider access the home office, then an alarm may be triggered.

In some implementations, one or more time components may also be associated with the service profile. For example, a resident user may establish a predetermined threshold period of time that the service provider that provides the unattended service may be present in the property 101, present in a room of the property 101, or the like. If the service provider is determined to be in the property 101 for more than a predetermined threshold period of time, then the monitoring system may determine that an alarm event should be triggered. In some implementations, the predetermined period of time may be tied to a particular portion of the property 101 and not the property 10 as a whole. In such instances, if the service provider is determined to be located in any one particular portion of the property 101 for a more than a particular threshold period of time, then the monitoring system control unit 110 may trigger an alarm event.

The camera specification database 116 may include camera specification data for different cameras. In some implementations, the camera specification database 116 may only store camera specification data for cameras installed at the property. In other implementations, the camera specification database 116 may store camera specification data for any camera that is available for use with the monitoring system 100. In such implementations, the camera specification database 116 may be periodically updated from one or more remote sources storing camera specification data via a connection to one or more of local network 140, remote network 170, or one or more communications links 172.

Camera specification data includes data describing the capabilities or configurations of a particular camera. For the particular camera, camera specification data may include, for example, horizontal fields of view for the particular camera, vertical fields of view for the particular camera, effective range of the particular camera, mounting styles for the particular camera, angles that each possible mount would allow the particular camera to be adjusted to, and any other characteristic of the particular camera that can be used to analyze the particular cameras capabilities. Additional characteristics may include for example, whether the camera can automatically move to track an object after it is mounted without human user interaction, whether the camera can capture images in low light areas, whether the camera has a motion sensors, or the like.

The three-dimensional map database 112 may include one or more three-dimensional maps of the property 110. In some implementations, the three-dimensional map database 112 may store a single three-dimensional map of the property 101. In other implementations, the three-dimensional map database 112 may include multiple different three-dimensional maps that each represent different portions of the property 101. In yet other implementations, the three-dimensional map database 112 may be a shared three-dimensional map database that is accessible via one or more network such as the local network 140, the remote network 170, one or more communications links 172 or a combination thereof. The shared three-dimensional map database may store three-dimensional maps of multiple different properties.

In some implementations, the three-dimensional map database 112, the service profile database 114, and the camera specification database 116 may be stored local on the monitoring system control unit 110 or one or more of the cameras 130a to 130e. However, the present disclosure need not be so limited. For example, one or more of the three-dimensional map databases may be stored remotely one or more computer such as the monitoring application server 180. In such instances, each respective database may be accessed the monitoring system control unit 110 or other entity performing the optimization of the camera placement using one or more networks such as the networks 140, 170 or one or more communications links 172.

In some implementations, the three-dimensional map of property 101 may be generated a resident of the property 101 (or other user) using augmented reality applications on a user device such as user device 164. For example, the resident of the property 101 may employ an augmented reality application that accesses the camera of a user device 164 to capture video images of one or more portions of the property 101. The augmented reality application running on the user device may process the video captured by the captured by the camera of the mobile device to generate a three-dimensional map of the property 101.

In other implementations, a drone 160 may be employed to navigate the property 101 and use one or more drone-mounted cameras, drone-mounted sensors, or a combination thereof, to scan one or more portions of the property to generate a three-dimensional map for storage in the three-dimensional map database 112.

The monitoring system control unit 110 may begin a process for optimizing camera placement in response to the receipt of an instruction to optimize camera placement. This instruction may be received by a user device such as user device 164 via one or more networks 140, 180, one or more communications links 164, or a combination thereof. Alternatively, or in addition, the instruction may be received from a remote server such as the monitoring application server 180 or central alarm station server 190 via one or more networks 140, 180, one or more communications links 164, or a combination thereof. Alternatively, or in addition, the instruction may be automatically triggered by internal processes of the monitoring system control unit 110 in response to the occurrence of a predetermined time or date. The predetermined time or date may be a scheduled time or date. Alternatively, the predetermined time or date may include the initial setup, installation, or configuration of the monitoring system control unit 110.

In some implementations, the predetermined time that the monitoring system may be configured to accommodate the unattended service may be selected based on the particular type of unattended service requested by an unattended service provider. For example, for an unattended service performed by a plumber to fix a leaking sink, the predetermined amount of time that the monitoring system may be configured for the unattended plumbing services may be 2 hours. Alternatively, for an unattended service performed by a delivery man that is delivering a package to the home, the predetermined amount of time that the monitoring system may be configured for the unattended delivery service may include 5 minutes, or less. In some implementations, the predetermined amount of time may be done on portion-by-portion location of the property 101. For example, for a delivery of groceries to refrigerator in the kitchen of the property, the predetermined amount of time may include multiple predetermined amounts of time such as 30 seconds to one minute in a foyer before traveling into a living room between the foyer and the kitchen, 30 seconds to one minute in a living room that is between the foyer and the kitchen, one minute to two minutes to unload groceries into the refrigerator in the kitchen, 30 second to one minute to pass back through the living room to the foyer, another 30 second to one minute to pass through the foyer and out the front door. Each of these times may be customizable and stored in a particular service profile for each particular unattended service. In some implementations, the monitoring system can provide visual and audio cues as to the beginning and expiration of the predetermined amounts of time. For example, the monitoring system can output an audio message from one or more speakers, a video and audio message from one or more displays, flashing lights, or any combination thereof, that makes the unattended service provider aware of the predetermined time periods for which the monitoring system will remain configured for to accommodate the unattended service.

The monitoring system control unit 110 may access a three-dimensional map of the property 101. For example, the monitoring system control unit 110 may obtain the three-dimensional map of property 100 from the three-dimensional map database 112.

The monitoring system control unit 110 may process service profile data from service profile database 114 and camera specification data 116 in view of the three-dimensional map of the property 101. This processing may include the performance of calculations to determine an optimal mix of cameras, camera locations, and camera orientations that enable the monitoring system 100 to obtain image data of each portion of property associated with each service profile.

The calculations performed by the monitoring system control unit 110 can include a determination, by the monitoring system control unit 110 based on the evaluation of each potential camera configuration and locations of a property 101 identified by a service profile, whether each portion of the property 101 that is associated with an unattended service type identified by the service profile, and boundaries thereof, are visible to a camera. In response to determining that each portion of the property 101 associated with an unattended service is visible to a camera such as cameras 130a to 130e, then the monitoring system control unit 110 may determine that cameras currently installed at the property 101 sufficiently monitor the unattended service identified by the service profile. Alternatively, in response to determining that each portion of the property 101 that is associated with an unattended service is not visible to a camera such as cameras 130a to 130e, then the monitoring system control unit 110 may determine that one or more cameras should be installed at the property 101 to sufficiently monitor portions of the property 101 associated with unattended services. In such instances, the monitoring system control unit 110 can generate output that provides a recommendation to a resident of the property 101 regarding camera placement.

In some implementations, the monitoring system 100 may be configured to optimize camera placement for an unattended service such as unattended grocery delivery. By way of example with reference to FIG. 1, the monitoring system control unit 110 (or monitoring application server 180) may access a three-dimensional map of the property 101 stored in the three-dimensional map database 114 and then access (i) at least one service profile related to the "grocery delivery" and (ii) camera specification data. The service profile having an identifier such as "grocery delivery." The service profile may also define one or more portions of the property 101 that a service provider can access when performing the unattended service. For example, the service profile may include data that indicates that the service provider can only access the portion of the property 101 that is associated with the path #1 in FIG. 1 that extends from the door at point A to the refrigerator 105 at point B while performing the unattended grocery delivery service.

The monitoring system control unit 110 (or monitoring application server 180) may determine whether there is sufficient camera placement to monitor the entire path defined by the service profile for the unattended grocery delivery service. This determination related to the sufficiency of camera placement for monitoring the unattended grocery delivery service may be based, at least in part, on the processing of the three-dimensional map, the service profile, and the camera specification data. In some implementations, such a determination may include projecting data indicative of camera viewing angles from each known mounting position for the camera onto the three-dimensional map of the property 101. Based on these determinations, the monitoring system control unit 110 (or monitoring application server 180) can determine whether each of the one or more portions of the property 101 (e.g., the path from point A to point B) identified by the service profile as being associated with the unattended grocery delivery service falls within the line-of-sight of an existing camera.

The monitoring system control unit 110 (or monitoring application server 180) can provide recommendations regarding camera placement based on these determinations related to the sufficiency of the camera placement. For example, if the monitoring system control unit 110 (or monitoring application server 180) determines that one or more portions of the property 101 identified by the service profiles as being associated with the unattended grocery delivery service are not covered by a line-of-sight from at least one existing camera, then the monitoring system control unit 110 (or monitoring application server 180) may make a recommendation to improve the sufficiency of the camera coverage. For example, the monitoring system control unit 110 (or monitoring application server 180) can recommend placement of one or more new cameras such as camera 150 in a location that enables camera line-of-sight coverage of path #1 when a service provider accesses the property 101 to render the unattended grocery delivery service associated with the service profile that defines the path. Alternatively, in other implementations, for example, the monitoring system control unit 110 (or monitoring application server 180) can recommend moving, or otherwise adjusting, one or more existing cameras 130d in order to improve camera coverage of the one or more portions of the property 101 identified by the service profile as being necessary for the unattended grocery delivery service.

The monitoring system control unit 110 (or monitoring application server 180) may output the camera placement recommendations in a variety of different ways. For example, the monitoring system control unit 110 (or monitoring application server 180) may transmit data to a mobile device 164 that, when processed and rendered by the mobile device 164, a map of the property 101 with graphical indicators that represent one or more recommended locations for camera placement. In some implementations, the map may include a two-dimensional floor plan of one or more portions of the property 101. In other implementations, the map may include a three-dimensional map of one or more portions of the property 101.

The graphical indicator may include any graphical mark that can be superimposed on the map of the property 101 to convey a recommended camera placement location. This may include a graphical image of camera that is superimposed onto the map of the property 101. In such instances, the graphical image of the camera may also project a representation of the line-of view of the line-of-sight of the camera. In some implementations, the map may also visually highlight the portions of the property 101 that are accessible to a service provider based on the one or more portions identified in the service profile as being accessible to the service provider when rendering the unattended service. In some implementations, the map may also show line-of-site video coverage achieved by other cameras already installed at the property 101. Accordingly, a user of the user device 164 can review the current camera coverage of one or more portions of the property 101 associated with an unattended server and also review camera placement recommendations generated based on that analysis performed by the monitoring system control unit 110 (or monitoring application server 180).

However, other types of output may also be generated by the monitoring system control unit 110 (or monitoring application server 180). For example, in some implementations, the monitoring system control unit 110 (or monitoring application server 180) generate a report that can be output that provides data representing a particular camera placement. The report may be output using audio data output by a speaker of the monitoring system control unit 110 (or monitoring application server 180), printed on paper using a printer that is connected to the monitoring system control unit 110 (or monitoring application server 180), or the like. In some implementations, the monitoring system control unit 110 (or monitoring application server 180) can transmit an instruction to a drone 162 that instructs the drone to (i) navigate to a room of the property 101 associated with the camera recommendation and (ii) shine a laser, or other light, to mark the portion of the property 101 where a camera should be placed.

The example of FIG. 1 describes a system for optimizing placement of cameras for monitoring unattended services with respect an unattended grocery delivery service. However, the present disclosure need not be so limited. For example, the system for optimizing placement of cameras for monitoring unattended services can be used for any unattended service. Such unattended services may include, for example, plumbing services, HVAC maintenance services, property cleaning services, home repair services, or the like.

FIG. 2 is a flowchart of a process 200 for optimizing placement of cameras for monitoring unattended services. In general, the process 200 may include accessing a three-dimensional map of the property (210), accessing a service profile that defines (i) a service type and (ii) one or more portions of the property that are associated with the service type (220), camera configuration data for each camera of one or more cameras installed at the property (230), determining, based on the three-dimensional map, the service profile, and the camera specification data, whether current placement of the one or more cameras is sufficient to monitor the one or more portions of the property that are associated with the service type (240), and providing output data for consumption by a user that provides an indication of the level of sufficiency associated with the current camera placement for the service (250). The process 200 may be performed by a monitoring unit that is local to the property such as the monitoring system control unit 110. Alternatively, the process 200 may be performed by a monitoring unit that is remote from the property such as the monitoring application server 180.

Figure 3:
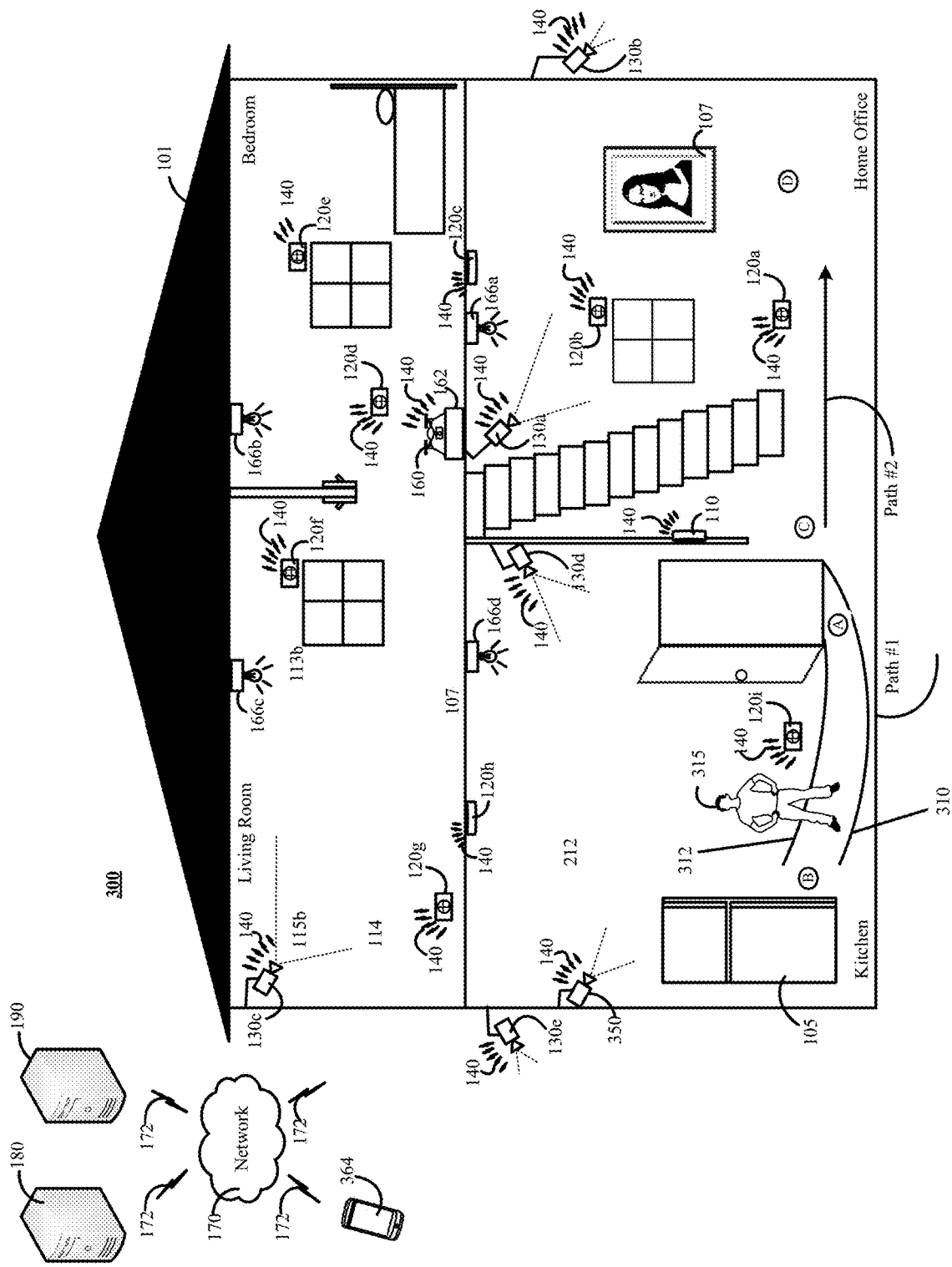
FIG. 3 is a contextual diagram of a monitoring system that is configured to monitor unattended services.

FIG. 3 is a contextual diagram of a monitoring system 300 that is configured to monitor unattended services. The monitoring system 300 is the same monitoring system as the monitoring system 100. However, instead of the monitoring system 300 being used to optimize placement of cameras for monitoring unattended services as described with reference to FIG. 1, the monitoring system 300 described as being used to monitor unattended services.

With reference to the example of FIG. 3, the monitoring system control unit 110 (or monitoring application server 180) receives a request to enter the property 101. No residents of the property 101 are present at the time that the request is received. The request to enter the property may be from a mobile device 364. The request may include data identifying the type of request to be performed, an estimated arrival time, or a combination thereof. In some implementations, the request may be automatically triggered and transmitted to the monitoring system control unit 110 (or monitoring application server 180) in response to a determination that the mobile device 364 is within a predetermined distance of the property 101. The mobile device 364 may be a mobile device of a service provider who is to perform an unattended service. Alternatively, the mobile device 364 may be a mobile device of a resident of the property 101.

The monitoring system control unit 110 (or monitoring application server 180) may determine a particular type of unattended service to be performed at the property 101. For example, the monitoring system control unit 110 (or monitoring application server 180) may determine that the request is from a service provider such as an appliance technician 215 who has arrived at the property 101 to perform scheduled maintenance of the refrigerator 105 located in the kitchen of the property 101. In some implementations, this determination may be made based data included in the request for entry to the property 101. In other implementations, the determination may be based on data identifying a particular service in a calendar application.

The monitoring system control unit 110 (or monitoring application server 180) can access a service profile based on the determined type of service. For example, the monitoring system control unit 110 (or monitoring application server 180) can access a service profile for kitchen appliance maintenance in response to a determination that an appliance technician has requested access to the property 101 to work on the refrigerator 105. The monitoring system control unit 110 (or monitoring application server 180) can determine, based on the accessed service profile, the one or more portions of the property 101 that the service technician is permitted to access to perform the unattended service of refrigerator 105 maintenance. With reference to FIG. 3, the monitoring system control unit 110 (or monitoring application server 180) can determined, based on the service profile information, that the appliance technician can access portions of the property along Path #1 and predetermined distance 105*a* around the refrigerator 105.

The monitoring system control unit 110 (or monitoring application server 180) can dynamically configure the monitoring system 300 to allow access to one or more portions of the property necessary for performance of the unattended service based on the accessed service profile. Dynamically configuring the monitoring system 300 may include disregarding sensor data from one or more sensors of a monitoring system 300 that are configured to monitor one or more portions of the property identified by the accessed service profile as being associated with the particular type of service. This may include, for example, disregarding motion sensors, contact sensors, glass break sensors, or the like, in the one or more portions of the property identified by the accessed service profile for the unattended service as being accessible to the appliance technician 215 performing the unattended service. For example, in the example of FIG. 3, the monitoring system control unit 110 (or monitoring application server 180) can disregard sensor data generated by the motion sensor 120*h*.

In some implementations, the monitoring system can be dynamically configured based on the particular service. For example, for an unattended delivery of groceries, one or more motion sensors and one or more door contact sensors may be disabled, or sensors data from the one or more motions sensors or one or more door contact sensors may be disregarded. However, for such an unattended delivery of groceries, glass break sensors located at the property and window contact sensors located at the property may stay armed. This is because the unattended delivery person should not have a reason to break glass or open windows as part of the unattended grocery delivery.

By way of another example, for an unattended window washing services, the monitoring system may be disable window contact sensors, one or more door contact sensors, and any motion sensors in rooms having windows, or along a path leading to a room with windows, so that the unattended window washer can have access to all the windows. Instead of disabling such sensors, the monitoring system can alternatively disregard sensor data from each of the aforementioned sensors. However, for such an unattended window washing service, motion sensors in rooms that do not have windows and that are not along a path to any rooms that have windows may remain armed. Similarly, contact sensors one or more doors may be remain armed if the door does not lead to a room with a window or an exit required by the unattended delivery person. This is because the unattended window washer does not require access to such portions of the property. In this example of an unattended window washer, motion sensors may remain armed in a basement that does not have any windows and a contact sensor on the doorway leading to the basement may remain armed. Armed sensors may trigger sensor data that, when detected by the monitoring system, trigger an alarm event.

Dynamically configuring the monitoring system 300 may also include the monitoring system control unit 110 (or monitoring application server 180) determining one or more doors of the property 101 that need to be opened to facilitate access to the portions of the property 101 necessary for performance of the unattended service. In some implementations, such as for a non-perishable package delivery, the monitoring system control unit 110 (or monitoring application server 180) may transmit an instruction to a garage door opening unit that triggers the opening of the garage door. In other implementations, the monitoring system control unit 110 (or monitoring application server 180) may determine that a door such as the front door of the property 101 needs to be unlocked, opened, or both.

For example, in the example of FIG. 3, the monitoring system control unit 110 (or monitoring application server 180) may determine, based on the accessed service profile that the front door 309 needs to be unlocked. In some implementations, the monitoring system control unit 110 (or monitoring application server 180) may transmit instructions to a connected lock of the door 309 that triggers the connected lock of the door 309 to unlock and allow the appliance technician 215 to enter the property 101.

In some implementations, such as when a connected lock is not installed at the property 101, the monitoring system control unit 110 (or monitoring application server 180) may transmit a code for keypad of the door lock to the user device 164. The appliance technician could use the code for the keypad to unlock the door and gain entry to the property 101. In some implementations, the code for the keypad may include a temporary code that is designed to expire at the end of a predetermined period of time, after which, the temporary code can no longer be used to unlock the lock of the door 309. Alternatively, or in addition, the monitoring control unit 110 (or monitoring application server 180) may transmit a message to the user device 364 that provides directions that direct the appliance technician to a location where a key is hidden at the property 101 so that the appliance technician can obtain the key and use the key to enter the property 101.

The monitoring system control unit 110 (or monitoring application server 180) can obtain image data of one or more portions of the property 540. In some implementations, the monitoring system control unit 110 (or monitoring application server 180) may obtain images of just the one or more portions of the property identified by accessed service profile as being associated with the particular type of unattended service being performed by the appliance technician. In other implementations, the monitoring system control unit 110 (or monitoring application server 180) may obtain images from each of the cameras installed in the property 101. In some implementations, obtaining the image data may performed by a camera such as the camera 350, 130d. Image data may include still images, video images, or a combination thereof.

The monitoring system control unit 110 (or monitoring application server or camera 350, 130d, 130a, 130f) may determine, based on the image data, whether the appliance technician has crossed a boundary 310 or 312 or 150a that is associated with the one or more portions of the property 101 that define the portions of the property that the appliance technician 215 has permission to access. If the appliance technician 215, does not cross the boundaries 310, 320, 150a, then the monitoring system will not trigger an alarm event. In some implementations, the monitoring system control unit 110 (or monitoring application server 180) may provide, to the user device 164, data that can be used to generate a rendering on the display of the user device 364 that identify the portions of the property 101 that appliance technician 315 is allowed to access. For example, the portions or the property 101 that the appliance technician 315 is allowed to access may include a floor plan or three-dimensional map that highlight the portions of the property 101 that the appliance technician can access.

Figure 4:
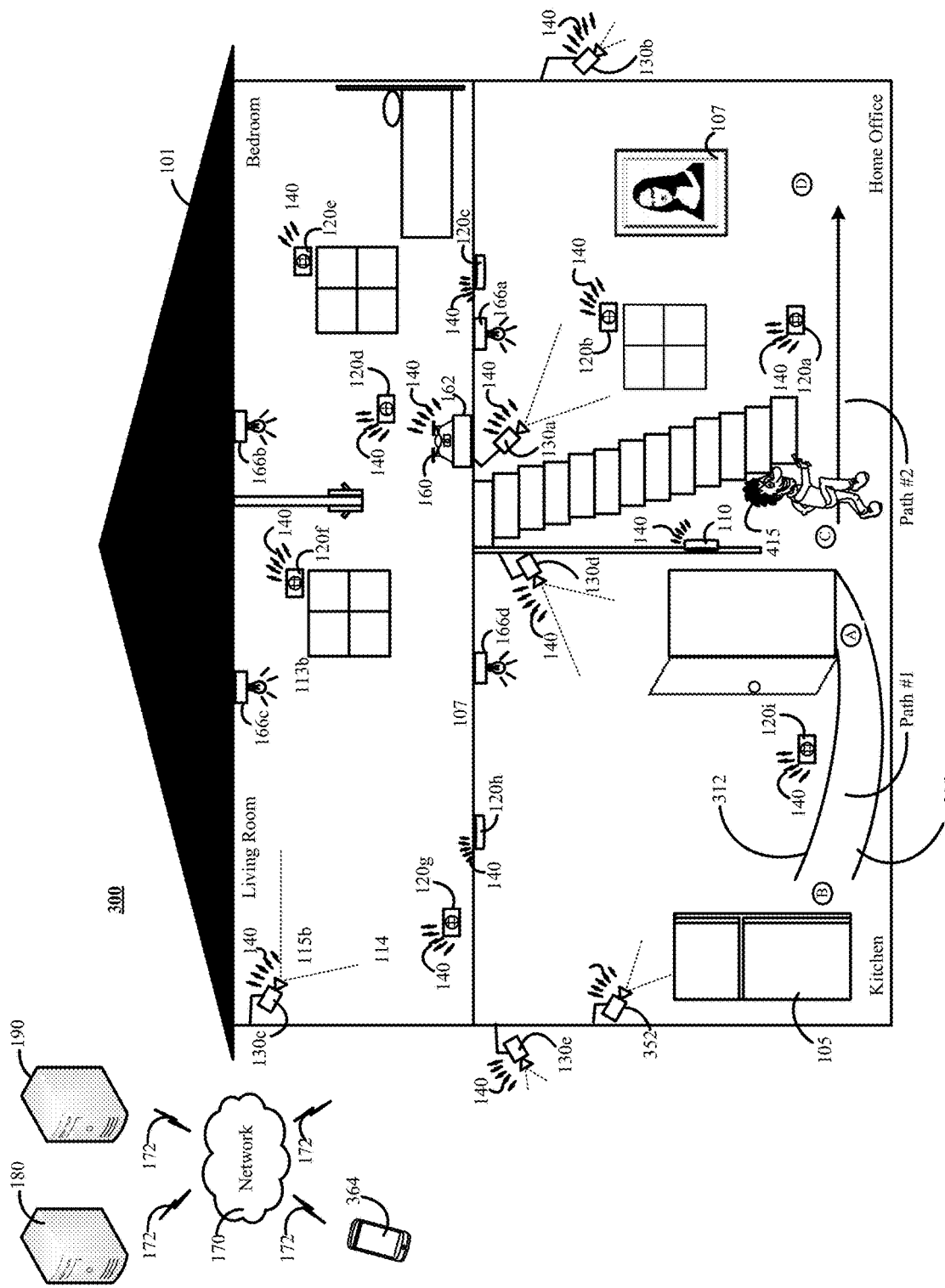
FIG. 4 is another contextual diagram of a monitoring system that is configured to monitor unattended services.

Alternatively, however, a person 415 that provides an unattended service may have malicious intent and stray from the portions of the property that the person 415 is permitted to enter. For example, with reference to FIG. 4, an example is provided wherein the person 415 that is to perform the unattended service strays from the allowed path #1. The person 415 strayed from permitted areas by crossing one or more of the boundary lines 310, 312, 105a, and instead, the person 415 followed path #2 to the home office.

In response to determining, based on the image data, that the service provider has crossed a boundary that is associated with the one or more portions of the property associated with the particular type of service, the monitoring system control unit 110 (or monitoring application server 180 or camera 130d, 350, 130a, 130f) may trigger the occurrence of an alarm event. This may include, for example initiating transmission of a notification that is indicative of an alarm event.

In some implementations, other monitoring system 300 components can be used to determine whether a person 415 has strayed from the permitted areas of the property 101 identified by the accessed service profile. For example, in some implementations, the monitoring system control unit 110 (or monitoring application server 180) may determine that a motion sensor such as motion sensor 120a generates sensor data indicative of motion in the home office even though the unattended service provider such as person 415 does not have access to the home office as a result of the service definitions in the access service profile. In such instances, because the home office motion sensor 120a is not a sensor that is identified as being disregarded in the accessed service profile, sensor data from the motion sensor 120a indicating that movement has occurred in the home office can cause the monitoring system control unit 110 (or monitoring application service 180) to trigger an alarm event. Accordingly, though a camera, or other component of the monitoring system, can analyze an image to determine whether an unattended delivery person has strayed beyond a boundary of a determined path, the present disclosure need not be so limited. Instead, armed sensors such as armed motion sensors, armed contact sensors, or the like, can be used to determine whether a user has strayed beyond a permitted boundary.

FIG. 5 is a flowchart of a process 500 that can be performed by a monitoring system to monitor unattended services. In general, the process 500 may include receiving a request to enter a property (510), determining, based on the received request, a particular type of service that is to be performed by the unattended service provider (520), accessing a service profile based on the particular type of service (530), dynamically configure the monitoring system, based on the accessed service profile, to allow access to one or more portions of the property to an unattended service provider (540), obtaining image data of the property associated with the particular type of service (550), determining, based on the image data, that the service provider has crossed a boundary that is associated with the particular type of service (560), and in response to determining, based on the image data, that the service provider has crossed a boundary that is associated with the one or more portions of the property associated with the particular type of service, triggering an alarm event (570). The process 500 may be performed by a monitoring unit that is local to the property such as the monitoring system control unit 110. Alternatively, the process 500 may be performed by a monitoring unit that is remote from the property such as the monitoring application server 180. However, the present disclosure need not be limited to these particular stages in this particular order.

For example, in some implementations, a process can be performed by a monitoring system to monitor unattended services that begins with the monitoring system receiving a request to enter the property to perform the unattended service. For example, an unattended service provider can submit a request through an application executing on a user device of the unattended service provider to perform an unattended service at the property. The application may be configured to communicate the request to the monitoring system. In other implementations, the unattended service provider may submit a request by providing an input to a control panel at the property. The control panel may include, for example, a keypad, a connected doorbell having a video camera, a graphical user interface located at the property that includes a selectable icon that, when selected, transmits a message to the monitoring system that indicates that the unattended service provider is requesting to enter the property to perform an unattended service. In some implementations, the request, or a follow-on request after an initial request, may include information describing a type of unattended service. For example, such a request, or follow-on request, can include data indicating the unattended service is a package delivery, grocery delivery, housekeeping services, plumbing services, HVAC services, or the like.

Based on the received request to enter the property to perform the unattended service, the monitoring system can continue execution of the process by configuring the monitoring system to allow access to a portion of the property associated with the unattended service without triggering an alarm event. In some implementations, configuring the monitoring system to allow access to a portion of the property where an unattended service is to be performed can include identifying one or more sensors that are used by the monitoring system to monitor the portion of the property associated with the unattended service, and instructing the monitoring system to disregard sensor data generated by one or more sensors of the monitoring system that are configured to monitor the portion of the property associated with the unattended service for a predetermined amount of time.

Alternatively, or in addition, configuring the monitoring system to allow access to a portion of the property where an unattended service is to be performed can include identifying one or more doors of the property that need to be unlocked to facilitate access to the portion of the property associated with the unattended service, and instructing the identified one or more doors to unlock or open without triggering an alarm event. Alternatively, or in addition, configuring the monitoring system to allow access to a portion of the property where an unattended service is to be performed can include identifying one or more doors of the property that need to be unlocked to facilitate access to the portion of the property associated with the unattended service, and transmitting a message to a user device of the unattended service provider, the message including a code that, when input into a control pad of a lock of at least one of the identified one or more doors, causes the identified one or more doors to unlock or open without triggering an alarm event.

The monitoring system can continue performance of the process by obtaining image data of one or more portions of the property after the monitoring system is configured to allow access to the portion of the property associated with the unattended service. The image data can be captured using one or more cameras installed in the property. The image data can include still images, videos, or any combination thereof.

The monitoring system can continue performance of the method by determining, based on the obtained image data, whether the unattended service provider has entered into a different portion of the property other than the portion of the property that is associated with the unattended service. In response to determining, based on the obtained image data, that the service provider entered into a different portion of the property other than the portion of the property that is associated with the unattended service, the monitoring system can trigger an alarm event. In some implementations, triggering the alarm event can include transmitting a first message to one or more speaker devices that, when processed by the one or more speaker devices, causes the one or more speaker devices to output an audible alarm. Alternatively, or in addition, triggering the alarm event can include transmitting a second message to another component of the monitoring system, the second message comprising information indicating that the unattended service provider entered a different portion that is different than the portion of the property associated with the unattended service.

In some implementations, the portion of the property associated with the unattended service can be defined using one or more boundaries. In such implementations, determining that the unattended service provider has entered into a different portion of the property other than the portion of the property associated with the unattended service can include determining, based on the obtained image data, whether the service provider has crossed one or more of the boundaries. In such implementations, in response to a determination, based on the obtained image data, that the service provider has crossed the one or more boundaries, the monitoring system can trigger an alarm event.

In some implementations, the monitoring system can receive data describing an unattended service to be performed. For example, the monitoring system can receive data input by an unattended service provider describing a type of unattended service to be performed. In such implementations, the monitoring system can determine, based on the received data, a particular type of unattended service that is to be performed by the unattended service provider. Then, the monitoring system can access a stored service profile based on the particular type of unattended service. In such implementations, the monitoring system can be configured using information included in the stored service profile.\

Figure 6:
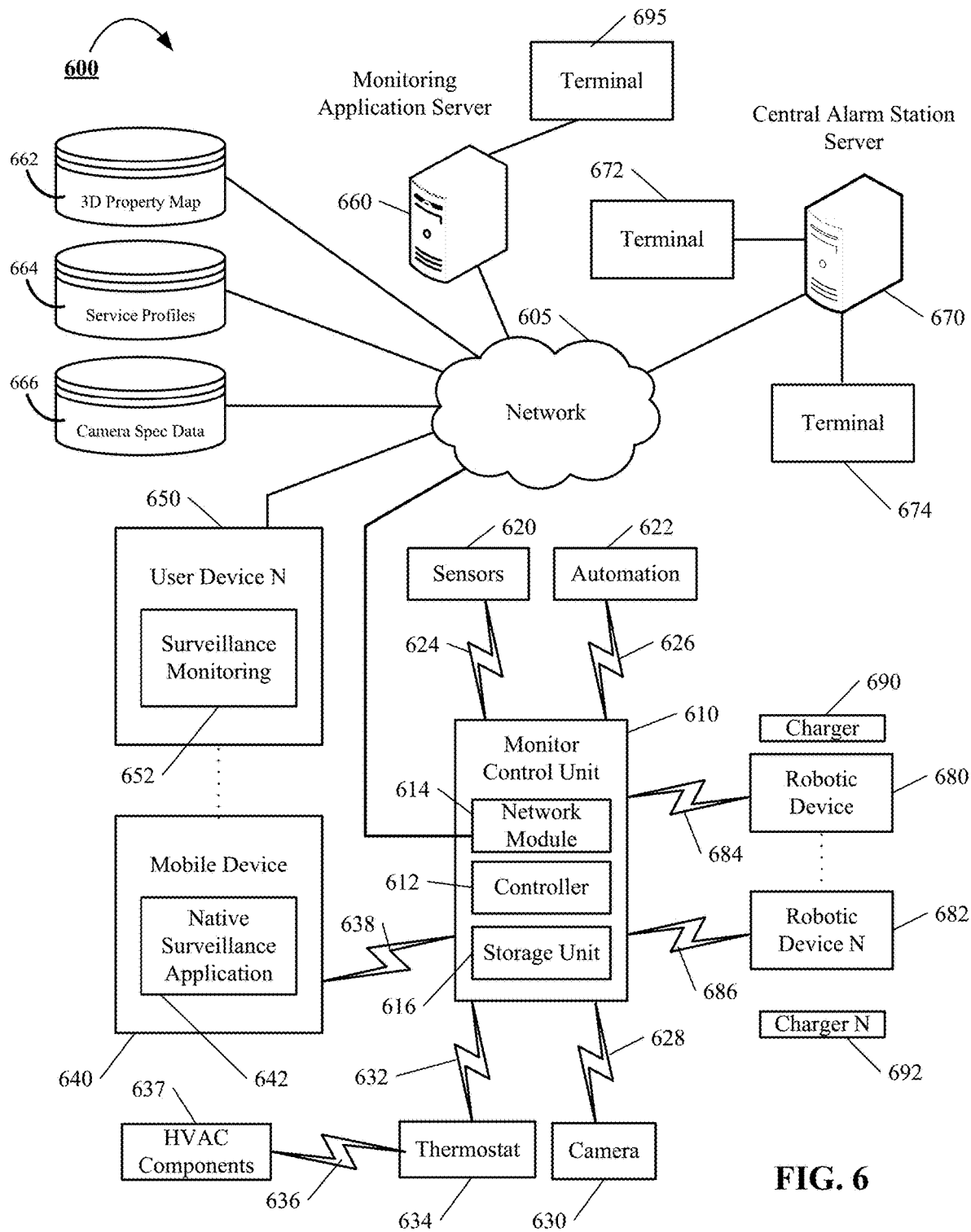
FIG. 6 is a block diagram of monitoring system components that can be used to configure a monitoring system for monitoring unattended services.

FIG. 6 is a block diagram of monitoring system components that can be used to configure a monitoring system for monitoring unattended services.

The electronic system 600 includes a network 605, a monitoring system control unit 610, one or more user devices 640, 650, a monitoring application server 660, and a central alarm station server 670. In some examples, the network 605 facilitates communications between the monitoring system control unit 610, the one or more user devices 640, 650, the monitoring application server 660, and the central alarm station server 670.

The network 605 is configured to enable exchange of electronic communications between devices connected to the network 605. For example, the network 605 may be configured to enable exchange of electronic communications between the monitoring system control unit 610, the one or more user devices 640, 650, the monitoring application server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The monitoring system control unit 610 includes a controller 612 and a network module 614. The controller 612 is configured to control a monitoring system (e.g., a home alarm or security system) that includes the monitoring system control unit 610. In some examples, the controller 612 may include a processor or other control circuitry configured to execute instructions of a program that controls operation of an alarm system. In these examples, the controller 612 may be configured to receive input from sensors, detectors, or other devices included in the alarm system and control operations of devices included in the alarm system or other household devices (e.g., a thermostat, an appliance, lights, etc.). For example, the controller 612 may be configured to control operation of the network module 614 included in the monitoring system control unit 610.

The monitoring system control unit 610 may be configured to perform any of the operations described with respect to the monitoring system control unit 110 described herein with reference to FIGS. 1-5. For example, the monitoring system control unit 610 may be configured to optimize camera placement at the property by analyzing data maintained in a service profile database 664 and a camera specification data database 666 in view of a three-dimensional map of the property that is stored in a property map database 662. In some implementations, the three-dimensional map database 662, service profile database 664, and camera specification database 666 are stored by the monitoring system control unit 610. In other implementations, the three-dimensional map database 662, service profile database 664, and camera specification database 666 are stored on a remote platform such as the monitoring application server 660 and are accessible to the monitoring system control unit 610 via a network 605 and one or more communications links.

The service profile database 664 may store one or more service profiles associated with the property. A service profile may include a data structure that conceptually organizes stored data describing a particular unattended service and a particular portion of the property that is associated with the service. By way of example, a particular unattended service may include the delivery of groceries when a resident of the property, plumbing services, appliance services, housekeeping services, HVAC services, or the like.

The camera specification database 666 may include camera specification data for different cameras. In some implementations, the camera specification database 666 may only store camera specification data for cameras installed at the property. In other implementations, the camera specification database 666 may store camera specification data for any camera that is available for use with the monitoring system 600. In such implementations, the camera specification database 666 may be periodically updated from one or more remote sources storing camera specification data via a connection to one or more of networks 605.

Camera specification data includes data describing the capabilities or configurations of a particular camera. For the particular camera, camera specification data may include, for example, horizontal fields of view for the particular camera, vertical fields of view for the particular camera, effective range of the particular camera, mounting styles for the particular camera, angels that each possible mount would allow the particular camera to be adjusted to, and any other characteristic of the particular camera that can be used to analyze the particular cameras capabilities. Additional characteristics may include for example, whether the camera can automatically move to track an object after it is mounted without human user interaction, whether the camera can capture images in low light areas, whether the camera has a motion sensors, or the like.

The three-dimensional map database 662 may include one or more three-dimensional maps of the property. In some implementations, the three-dimensional map database 662 may store a single three-dimensional map of the property. In other implementations, the three-dimensional map database 662 may include multiple different three-dimensional maps that each represent different portions of the property. In yet other implementations, the three-dimensional map database 662 may be a shared three-dimensional map database that is accessible via one or more network such as the local networks 605. The shared three-dimensional map database may store three-dimensional maps of multiple different properties.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the monitoring system control unit 610 to communicate over a local area network and/or the Internet. The network module 614 also may be a voiceband modem configured to enable the alarm panel to communicate over the telephone lines of Plain Old Telephone Systems (POTS).

The monitoring system that includes the monitoring system control unit 610 includes one or more sensors or detectors. For example, the monitoring system may include multiple sensors 620. The sensors 620 may include a contact sensor, a motion sensor, a glass break sensor, or any other type of sensor included in an alarm system or security system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 620 may include a radio-frequency identification (RFID) sensor that identifies a particular article that includes a pre-assigned RFID tag.

The monitoring system control unit 610 communicates with the module 622 and the camera 630 to perform surveillance or monitoring. The module 622 is connected to one or more devices that enable home automation control. For instance, the module 622 may be connected to one or more lighting systems and may be configured to control operation of the one or more lighting systems. Also, the module 622 may be connected to one or more electronic locks at the property and may be configured to control operation of the one or more electronic locks (e.g., control Z-Wave locks using wireless communications in the Z-Wave protocol. Further, the module 622 may be connected to one or more appliances at the property and may be configured to control operation of the one or more appliances. The module 622 may include multiple modules that are each specific to the type of device being controlled in an automated manner. The module 622 may control the one or more devices based on commands received from the monitoring system control unit 610. For instance, the module 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building monitored by the monitoring system control unit 610. The camera 630 may be configured to capture single, static images of the area and also video images of the area in which multiple images of the area are captured at a relatively high frequency (e.g., thirty images per second). The camera 630 may be controlled based on commands received from the monitoring system control unit 610.

The camera 630 may be triggered by several different types of techniques. For instance, a Passive Infra Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra Red, Z-wave controlled "white" lights, lights controlled by the module 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the monitoring system control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring application server 660 over the Internet. In these implementations, image data captured by the camera 630 does not pass through the monitoring system control unit 610 and the camera 630 receives commands related to operation from the monitoring application server 660.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the monitoring system control unit 610 and can control the environmental (e.g., temperature) settings based on commands received from the monitoring system control unit 610.

In some implementations, the thermostat 634 is a dynamically programmable thermostat and can be integrated with the monitoring system control unit 610. For example, the dynamically programmable thermostat 634 can include the monitoring system control unit 610, e.g., as an internal component to the dynamically programmable thermostat 634. In addition, the monitoring system control unit 610 can be a gateway device that communicates with the dynamically programmable thermostat 634.

A module 637 is connected to one or more components of an HVAC system associated with a property, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

The system 600 further includes one or more robotic devices 680 and 682. The robotic devices 680 and 682 may be any type of robots that are capable of moving and taking actions that assist in security monitoring. For example, the robotic devices 680 and 682 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 680 and 682 may be robotic devices that are intended for other purposes and merely associated with the monitoring system 600 for use in appropriate circumstances. For instance, a robotic vacuum cleaner device may be associated with the monitoring system 600 as one of the robotic devices 680 and 682 and may be controlled to take action responsive to monitoring system events.

In some examples, the robotic devices 680 and 682 automatically navigate within a property. In these examples, the robotic devices 680 and 682 include sensors and control processors that guide movement of the robotic devices 680 and 682 within the property. For instance, the robotic devices 680 and 682 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 680 and 682 may include control processors that process output from the various sensors and control the robotic devices 680 and 682 to move along a path that reaches the desired destination and avoids obstacles. In this regard, the control processors detect walls or other obstacles in the property and guide movement of the robotic devices 680 and 682 in a manner that avoids the walls and other obstacles.

In addition, the robotic devices 680 and 682 may store data that describes attributes of the property. For instance, the robotic devices 680 and 682 may store a floorplan and/or a three-dimensional model of the property that can be used as a map to enable the robotic devices 680 and 682 to navigate the property. During initial configuration, the robotic devices 680 and 682 may receive the data describing attributes of the property, determine a frame of reference to the data (e.g., a home or reference location in the property), and navigate the property based on the frame of reference and the data describing attributes of the property. Further, initial configuration of the robotic devices 680 and 682 also may include learning of one or more navigation patterns in which a user provides input to control the robotic devices 680 and 682 to perform a specific navigation action (e.g., fly to an upstairs bedroom and spin around while capturing video and then return to a home charging base). In this regard, the robotic devices 680 and 682 may learn and store the navigation patterns such that the robotic devices 680 and 682 may automatically repeat the specific navigation actions upon a later request.

The robotic devices 680 and 682 also may include a communication module that enables the robotic devices 680 and 682 to communicate with the monitoring system control unit 610, each other, and/or other devices. The communication module may be a wireless communication module that allows the robotic devices 680 and 682 to communicate wirelessly. For instance, the communication module may be a Wi-Fi module that enables the robotic devices 680 and 682 to communicate over a local wireless network at the property. The communication module further may be a 900 MHz wireless communication module that enables the robotic devices 680 and 682 to communicate directly with the monitoring system control unit 610. Other types of short-range wireless communication protocols, such as Bluetooth, Bluetooth LE, Z-Wave, ZigBee, etc., may be used to allow the robotic devices 680 and 682 to communicate with other devices in the property.

The robotic devices 680 and 682 are associated with one or more docking stations 690 and 692. The docking stations 690 and 692 may be located at a predefined home base, one or more reference locations in the property, or both. The robotic devices 680 and 682 may be configured to navigate to the docking stations 690 and 692 after completion of tasks needed to be performed for the monitoring system 600. For instance, after completion of a task such as performing routine surveillance of a property, a robotic device such as robotic devices 680 or 682 may be configured to automatically navigate to a room of property that include one of the docking stations 690 and 692 and dock with the docking station 690 or 692. Docking with a docking station 690 or 692 may include establishing a removable coupling between a robotic device 680 or 682 and a docking station 690 or 692. The removable coupling may include a physical connection using one or more mechanisms to removably couple to the robotic device 680 or 682 to the docking station 690 or 692 such as a deployable arm, a latching mechanism, a magnet, or the like. The docking stations 690 or 692 may be configured to charge the robotic device 680 or 682 while the robotic device 680 or 682 is removably coupled to the docking station 690 or 692. In this regard, the robotic devices 680 and 682 may automatically maintain a fully charged battery in a state in which the robotic devices 680 and 682 are ready for use by the monitoring system 600.

The docking stations 690 and 692 may facilitate contact based battery charging and/or wireless based battery charging. For contact based battery charging, the robotic devices 680 and 682 may have readily accessible points of contact that the robotic devices 680 and 682 are capable of positioning and mating with a corresponding contact on the docking station 690 or 692. For instance, a helicopter type robotic device may have an electronic contact on a portion of its landing gear that rests on and mates with an electronic pad of a docking station 690 or 692 when the helicopter type robotic device lands on the docking station. The electronic contact on the robotic device may include a cover that opens to expose the electronic contact when the robotic device 680 or 682 is charging and closes to cover and insulate the electronic contact when the robotic device 680 or 682 is in operation.

For docking stations that charge wirelessly, the robotic devices 680 and 682 may charge through a wireless exchange of power. In these cases, the robotic devices 680 and 682 need only locate themselves closely enough to the docking station that charges wirelessly for the wireless exchange of power to occur. In this regard, the positioning needed to land at a predefined home base or reference location in the property may be less precise than with a docking station that charges based on contact. Based on the robotic devices 680 and 682 landing at a docking station that charges wirelessly, the docking station outputs a wireless signal that the robotic devices 680 and 682 receive and convert to a power signal that charges a battery maintained on the robotic devices 680 and 682.

In some implementations, each of the robotic devices 680 and 682 has a corresponding and assigned docking station 690 and 692 such that the number of robotic devices 680 and 682 equals the number of docking stations 690 and 692. In these implementations, the robotic devices 680 and 682 always navigate to the specific docking station assigned to that robotic device. For instance, the robotic device 680 may always use docking station 690 and the robotic device 682 may always use docking station 692.

In some examples, the robotic devices 680 and 682 may share docking stations. For instance, the robotic devices 680 and 682 may use one or more community docking stations that are capable of docking multiple robotic devices 680 and 682. The community docking station may be configured to charge multiple robotic devices 680 and 682 in parallel. For example, one robotic device 680 may be removably coupled to the docking station 690 or 692 and another robotic device 682 may navigate around the same docking station and charge wirelessly. The community docking station may be configured to charge multiple robotic devices 680 and 682 in serial such that the multiple robotic devices 680 and 682 take turns charging and, when fully charged, return to a predefined home base or reference location in the property that is not associated with a charger. The number of community docking stations may be less than the number of robotic devices 680 and 682.

Also, the docking stations 690 and 692 may not be assigned to specific robotic devices 680 and 682 and may be capable of charging any of the robotic devices 680 and 682. In this regard, the robotic devices 680 and 682 may use any suitable, unoccupied docking station when not in use. For instance, when one of the robotic devices 680 and 682 has completed an operation or is in need of battery charging, the monitoring system control unit 610 references a stored table of the occupancy status of each docking station and instructs the robotic device to navigate to the nearest docking station that is unoccupied.

The sensors 620, the module 622, the camera 630, the thermostat 634, and the robotic devices 680 and 682 communicate with the controller 612 over communication links 624, 626, 628, 632, 684, and 686. The communication links 624, 626, 628, 632, 684, and 686 may be a wired or wireless data pathway configured to transmit signals from the sensors 620, the module 622, the camera 630, the thermostat 634, and the robotic devices 680 and 682 to the controller 612. The sensors 620, the module 622, the camera 630, the thermostat 634, and the robotic devices 680 and 682 may continuously transmit sensed values to the controller 612, periodically transmit sensed values to the controller 612, or transmit sensed values to the controller 612 in response to a change in a sensed value.

The communication links 624, 626, 628, 632, 684, and 686 may include a local network. The sensors 620, the module 622, the camera 630, the thermostat 634, and the robotic devices 680 and 682 and the controller 612 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 6 (CAT5) or Category 6 (CAT6) wired Ethernet network. The local network may be a mesh network constructed based on the devices connected to the mesh network.

The monitoring application server 660 is an electronic device configured to provide monitoring services by exchanging electronic communications with the monitoring system control unit 610, the one or more user devices 640, 650, and the central alarm station server 670 over the network 605. For example, the monitoring application server 660 may be configured to monitor events (e.g., alarm events) generated by the monitoring system control unit 610. In this example, the monitoring application server 660 may exchange electronic communications with the network module 614 included in the monitoring system control unit 610 to receive information regarding events (e.g., alarm events) detected by the monitoring system control unit 610. The monitoring application server 660 also may receive information regarding events (e.g., alarm events) from the one or more user devices 640, 650.

In some examples, the monitoring application server 660 may route alarm data received from the network module 614 or the one or more user devices 640, 650 to the central alarm station server 670. For example, the monitoring application server 660 may transmit the alarm data to the central alarm station server 670 over the network 605.

In some implementations, the monitoring application server 660 may function as a cloud-based monitoring system control unit that is remote from the property where the sensors are installed. Accordingly, in addition to the operations explicitly attributed to the monitoring application server 660, the monitoring application server 660 may also be configured to perform each of the operations described herein with respect to the monitoring system control unit 110, 610. The monitoring application server 660 may communicate with the sensors, cameras, and other components installed at the property using one or more networks 605 and one or more communications links.

The central alarm station server 670 is an electronic device configured to provide alarm monitoring service by exchanging communications with the monitoring system control unit 610, the one or more robotic devices 680 and 682, the one or more mobile devices 640, 650, and the monitoring application server 660 over the network 605. For example, the central alarm station server 670 may be configured to monitor alarm events generated by the monitoring system control unit 610. In this example, the central alarm station server 670 may exchange communications with the network module 614 included in the monitoring system control unit 610 to receive information regarding alarm events detected by the monitoring system control unit 610. The central alarm station server 670 also may receive information regarding alarm events from the one or more mobile devices 640, 650, one or more robotic devices 680 and 682, and/or the monitoring application server 660.

The central alarm station server 670 is connected to multiple terminals 672 and 674. The terminals 672 and 674 may be used by operators to process alarm events. For example, the central alarm station server 670 may route alarm data to the terminals 672 and 674 to enable an operator to process the alarm data. The terminals 672 and 674 may include general-purpose computers (e.g., desktop personal computers, workstations, or laptop computers) that are configured to receive alarm data from a server in the central alarm station server 670 and render a display of information based on the alarm data. For instance, the controller 612 may control the network module 614 to transmit, to the central alarm station server 670, alarm data indicating that a sensor 620 detected a door opening when the monitoring system was armed. The central alarm station server 670 may receive the alarm data and route the alarm data to the terminal 672 for processing by an operator associated with the terminal 672. The terminal 672 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640, 650 are devices that host and display user interfaces. For instance, the user device 640 is a mobile device that hosts one or more native applications (e.g., the native surveillance application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a native surveillance application 642. The native surveillance application 642 refers to a software/firmware program running on the corresponding mobile device that enables the user interface and features described throughout. The user device 640 may load or install the native surveillance application 642 based on data received over a network or data received from local media. The native surveillance application 642 runs on mobile devices platforms, such as iPhone, iPod touch, Blackberry, Google Android, Windows Mobile, etc. The native surveillance application 642 enables the user device 640 to receive and process image and sensor data from the monitoring system.

The user device 650 may be a general-purpose computer (e.g., a desktop personal computer, a workstation, or a laptop computer) that is configured to communicate with the monitoring application server 660 and/or the monitoring system control unit 610 over the network 605. The user device 650 may be configured to display a surveillance monitoring user interface 652 that is generated by the user device 650 or generated by the monitoring application server 660. For example, the user device 650 may be configured to display a user interface (e.g., a web page) provided by the monitoring application server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640, 650 communicate with and receive monitoring system data from the monitoring system control unit 610 using the communication link 638. For instance, the one or more user devices 640, 650 may communicate with the monitoring system control unit 610 using various local wireless protocols such as wifi, Bluetooth, zwave, zigbee, HomePlug (ethernet over powerline), or wired protocols such as Ethernet and USB, to connect the one or more user devices 640, 650 to local security and automation equipment. The one or more user devices 640, 650 may connect locally to the monitoring system and its sensors and other devices. The local connection may improve the speed of status and control communications because communicating through the network 605 with a remote server (e.g., the monitoring application server 660) may be significantly slower.

Although the one or more user devices 640, 650 are shown as communicating with the monitoring system control unit 610, the one or more user devices 640, 650 may communicate directly with the sensors and other devices controlled by the monitoring system control unit 610. In some implementations, the one or more user devices 640, 650 replace the monitoring system control unit 610 and perform the functions of the monitoring system control unit 610 for local monitoring and long range/offsite communication.

In other implementations, the one or more user devices 640, 650 receive monitoring system data captured by the monitoring system control unit 610 through the network 605. The one or more user devices 640, 650 may receive the data from the monitoring system control unit 610 through the network 605 or the monitoring application server 660 may relay data received from the monitoring system control unit 610 to the one or more user devices 640, 650 through the network 605. In this regard, the monitoring application server 660 may facilitate communication between the one or more user devices 640, 650 and the monitoring system.

In some implementations, the one or more user devices 640, 650 may be configured to switch whether the one or more user devices 640, 650 communicate with the monitoring system control unit 610 directly (e.g., through link 638) or through the monitoring application server 660 (e.g., through network 605) based on a location of the one or more user devices 640, 650. For instance, when the one or more user devices 640, 650 are located close to the monitoring system control unit 610 and in range to communicate directly with the monitoring system control unit 610, the one or more user devices 640, 650 use direct communication. When the one or more user devices 640, 650 are located far from the monitoring system control unit 610 and not in range to communicate directly with the monitoring system control unit 210, the one or more user devices 640, 650 use communication through the monitoring application server 660.

Although the one or more user devices 640, 650 are shown as being connected to the network 605, in some implementations, the one or more user devices 640, 650 are not connected to the network 605. In these implementations, the one or more user devices 640, 650 communicate directly with one or more of the monitoring system components and no network (e.g., Internet) connection or reliance on remote servers is needed.

In some implementations, the one or more user devices 640, 650 are used in conjunction with only local sensors and/or local devices in a house. In these implementations, the system 600 only includes the one or more user devices 640, 650, the sensors 620, the module 622, the camera 630, and the robotic devices 680 and 682. The one or more user devices 640, 650 receive data directly from the sensors 620, the module 622, the camera 630, and the robotic devices 680 and 682 and sends data directly to the sensors 620, the module 622, the camera 630, and the robotic devices 680 and 682.

In other implementations, the system 600 further includes network 605 and the sensors 620, the module 622, the camera 630, the thermostat 634, and the robotic devices 680 and 682 are configured to communicate sensor and image data to the one or more user devices 640, 650 over network 605 (e.g., the Internet, cellular network, etc.). In yet another implementation, the sensors 620, the module 622, the camera 630, the thermostat 634, and the robotic devices 680 and 682 (or a component, such as a bridge/router) are intelligent enough to change the communication pathway from a direct local pathway when the one or more user devices 640, 650 are in close physical proximity to the sensors 620, the module 622, the camera 630, the thermostat 634, and the robotic devices 680 and 682 to a pathway over network 605 when the one or more user devices 640, 650 are farther from the sensors 620, the module 622, the camera 630, the thermostat 634, and the robotic devices 680 and 682. In some examples, the system leverages GPS information from the one or more user devices 640, 650 to determine whether the one or more user devices 640, 650 are close enough to the sensors 620, the module 622, the camera 630, the thermostat 634, and the robotic devices 680 and 682 to use the direct local pathway or whether the one or more user devices 640, 650 are far enough from the sensors 620, the module 622, the camera 630, the thermostat 634, and the robotic devices 680 and 682 that the pathway over network 605 is required. In other examples, the system leverages status communications (e.g., pinging) between the one or more user devices 640, 650 and the sensors 620, the module 622, the camera 630, the thermostat 634, and the robotic devices 680 and 682 to determine whether communication using the direct local pathway is possible. If communication using the direct local pathway is possible, the one or more user devices 640, 650 communicate with the sensors 620, the module 622, the camera 630, the thermostat 634, and the robotic devices 680 and 682 using the direct local pathway. If communication using the direct local pathway is not possible, the one or more user devices 640, 650 communicate with the sensors 620, the module 622, the camera 630, the thermostat 634, and the robotic devices 680 and 682 using the pathway over network 605.

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "Away" state, but set not to capture images when the alarm system is armed in a "Stay" state or disarmed. In addition, the camera 630 may be triggered to begin capturing images when the alarm system detects an event, such as an alarm event, a door opening event for a door that leads to an area within a field of view of the camera 630, or motion in the area within the field of view of the camera 630. In other implementations, the camera 630 may capture images continuously, but the captured images may be stored or transmitted over a network when needed.

In some examples, the robotic devices 680 and 682 may be assigned to different areas of the property where the robotic devices 680 and 682 can move in an unobstructed manner. In these examples, the robotic devices 680 and 682 may be assigned to different levels in a property (e.g., an upstairs robotic device and a downstairs robotic device) and even different rooms or sections that are potentially blocked by doors. The monitoring system control unit 610 coordinate tracking movement based on the assigned areas. For instance, the monitoring system control unit 610 determines areas in a property where an event has been detected and only controls the robotic devices assigned to the determined areas to operate.

In addition, the robotic devices 680 and 682 may be assigned as interior and exterior devices. The interior devices may navigate throughout an interior of the property. The exterior devices may navigate about an exterior periphery of the property. The exterior devices may be weather conditioned to remain outdoors (e.g., in an outdoor enclosure) at all times such that the exterior devices can explore an exterior of the property at any suitable time. In addition, the exterior devices may remain inside the property and the monitoring system control unit 610 may open a door to enable an exterior robotic device to leave and return to the property. For instance, an exterior device may have a base or reference location in a garage of the property and the monitoring system control unit 610 may automatically open a garage door to allow the exterior device to leave the garage and explore the exterior of the property.

In some implementations, the monitoring system control unit 610 may monitor operational status of the robotic devices 680 and 682 and coordinate further operation based on the operational status. In these implementations, the monitoring system control unit 610 may detect that a particular robotic device is no longer operational and control one or more other robotic devices to perform operations originally assigned to the non-operational robotic device.

In some implementations, the monitoring system control unit 610 may determine battery power available for each of the robotic devices 680 and 682 and coordinate operation of the robotic devices 680 and 682 based on available battery power. In these implementations, the robotic devices 680 and 682 may report battery power remaining to the monitoring system control unit 610 and the monitoring system control unit 610 may determine a subset of the robotic devices 680 and 682 to deploy based on the battery power information. For instance, the monitoring system control unit 610 may select to initially deploy the robotic device with the most available battery power to allow the other robotic devices to charge while the selected device assists with monitoring. Once the battery power for the selected device falls below a threshold, the monitoring system control unit 610 may return the selected device to a docking station and select the robotic device with the presently highest available battery power to resume the monitoring options being performed. The monitoring system control unit 610 may cycle through all of the robotic devices 680 and 682 in an intelligent manner that best leverages the battery power available. If the battery power of a device becomes too low to effectively operate as a navigating device, the monitoring system control unit 610 may control the robotic device to remain stationary and act as a stationary camera or other sensor to still assist with monitoring, although the added benefit of navigation no longer exists.

In some implementations, the robotic devices 680 and 682 may operate as mobile sensors that move throughout the property. In these implementations, the robotic devices 680 and 682 may have temperature sensors that can be used as inputs to a thermostat at the property. In this regard, the robotic devices 680 and 682 may navigate throughout the property and take temperature measurements at various locations in the property. With the temperatures at various locations, the system 600 may identify hot and/or cold spots in the property and adjust thermostat operation accordingly. For instance, the robotic devices 680 and 682 may be deployed to take temperature measurements in areas of the property where people are located and the thermostat may be adjusted to improve the temperature in the location where people are actually located in the property.

In some examples, the robotic devices 680 and 682 may have humidity and air flow sensors in addition to temperature sensors. In these examples, the robotic devices 680 and 682 may periodically navigate throughout the property and take temperature, humidity, and air flow measurements at various locations throughout the property. The system 600 may use the temperature, humidity, and air flow measurements to detect inefficient areas of the property. The inefficiencies may be used to detect areas where insulation in the property in deficient (e.g., new siding, windows, and/or doors may be useful in certain areas) and/or where leaks exist in the property. The property efficiency information may be provided to a user of the property to enable the user to improve efficiency in the property.

The invention claimed is:

1. A monitoring system for accommodating unattended service at a property, the monitoring system comprising:
   one or more processors; and
   one or more storage devices, the one or more storage devices storing instructions that, when executed by the one or more processors, cause the one or more processors to perform operations comprising:
      receiving a request to enter the property to perform the unattended service;
      determining, based on the received request, a particular type of unattended service;
      accessing a stored service profile based on the particular type of unattended service, wherein the service profile indicates that the particular type of unattended service permits access to a first portion of the property;
      based on the stored service profile, configuring the monitoring system to allow access to the first portion of the property associated with the particular type of unattended service without triggering an alarm event;
      obtaining image data of the property after the monitoring system is configured to allow access to the first portion of the property associated with the particular type of unattended service;
      determining, based on the obtained image data, that an unattended service provider has entered into a second, different portion of the property other than the first portion of the property that is associated with the particular type of unattended service; and
      in response to determining, based on the obtained image data, that the service provider entered into the second, different portion of the property other than the first portion of the property that is associated with the particular type of unattended service, triggering an alarm event.

2. The monitoring system of claim 1, wherein triggering the alarm event comprises (i) transmitting a first message to a speaker device that, when processed by the speaker device, causes the speaker device to output an audible alarm or (ii) transmitting a second message to another component of the monitoring system, the second message comprising information indicating that the unattended service provider entered the second, different portion that is different than the first portion of the property.

3. The monitoring system of claim 1,
   wherein the first portion of the property is defined using one or more boundaries,
   wherein determining, based on the obtained image data, that the unattended service provider has entered into the second, different portion of the property than the first portion of the property that is associated with the particular type of unattended service comprises:
      determining, based on the obtained image data, whether the service provider has crossed the one or more of the boundaries, and
   wherein in response to determining, based on the obtained image data, that the service provider entered into the second, different portion of the property other than the first portion of the property that is associated with the particular type of unattended service, triggering an alarm event comprises:
      in response to determining, based on the obtained image data, that the unattended service provider has crossed the one or more boundaries, triggering an alarm event.

4. The monitoring system of claim 3, wherein the one or more boundaries define a path from an entrance of the property to a particular location within the property that is associated with the particular type of unattended service.

5. The monitoring system of claim 1,
   wherein the received request comprises data describing an unattended service to be performed, and
   wherein determining, based on the received request, the particular type of unattended service comprises determining the particular type of unattended service based on the data describing the unattended service that is to be performed by the unattended service provider.

6. The monitoring system of claim 1,
   wherein configuring the monitoring system to allow access to the first portion of the property associated with the particular type of unattended service without triggering an alarm event comprises:
      identifying one or more sensors that are used by the monitoring system to monitor the first portion of the property associated with the particular type of unattended service; and configuring the monitoring system to disregard sensor data generated by the one or more sensors of the monitoring system that are configured to monitor the first portion of the property associated with the particular type of unattended service for a predetermined amount of time.

7. The monitoring system of claim 6, wherein the one or more sensors include a motion sensor, a contact sensor, or a glass break sensor.

8. The monitoring system of claim 1,
wherein configuring the monitoring system to allow access to the first portion of the property associated with the particular type of unattended service without triggering an alarm event comprises:
identifying one or more doors of the property that need to be unlocked to facilitate access to the first portion of the property associated with the particular type of unattended service; and
instructing the identified one or more doors to unlock or open without triggering an alarm event.

9. The monitoring system of claim 1,
wherein configuring the monitoring system to allow access to the first portion of the property associated with the particular type of unattended service without triggering an alarm event comprises:
identifying one or more doors of the property that need to be unlocked to facilitate access to the first portion of the property associated with the particular type of unattended service; and
transmitting a message to a user device of the unattended service provider, the message including a code that, when input into a control pad of a lock of at least one of the identified one or more doors, causes the identified one or more doors to unlock or open without triggering an alarm event.

10. The monitoring system of claim 1, the operations further comprising:
providing, to a user device of the unattended service provider, data that, when rendered by the user device, causes the user device to render display data on a display of the user device that describes a layout of the property, wherein display data indicates the first portion of the property associated with the particular type of unattended service that the unattended service provider is allowed to access.

11. The monitoring system of claim 10, wherein the display data includes data describing one or more boundaries of the first portion of the property that, if crossed by the unattended service provider, result in an alarm event being triggered by the monitoring system.

12. The monitoring system of claim 1, wherein the unattended service includes a service performed by a non-resident person or non-resident machine during a period of time when no resident of the property is located at the property.

13. The monitoring system of claim 1,
wherein the monitoring system receives the request to enter the property from the unattended service provider; and
wherein determining, based on the received request, the particular type of unattended service comprises:
identifying the unattended service provider; and
determining the particular type of unattended service based on identifying the service provider.

14. A method for accommodating unattended service at a property, the method comprising:
receiving a request to enter the property to perform the unattended service;
determining, based on the received request, a particular type of unattended service;
accessing a stored service profile based on the particular type of unattended service, wherein the service profile indicates that the particular type of unattended service permits access to a first portion of the property;
based on the stored service profile, configuring a property monitoring system to allow access to the first portion of the property associated with the unattended service without triggering an alarm event;
obtaining image data of the property after the monitoring system is configured to allow access to the first portion of the property associated with the particular type of unattended service;
determining, based on the obtained image data, that an unattended service provider has entered into a second, different portion of the property other than the first portion of the property that is associated with the particular type of unattended service; and
in response to determining, based on the obtained image data, that the service provider entered into the second, different portion of the property other than the first portion of the property that is associated with the particular type of unattended service, triggering an alarm event.

15. The method of claim 14, wherein triggering the alarm event comprises (i) transmitting a first message to a speaker device that, when processed by the speaker device, causes the speaker device to output an audible alarm or (ii) transmitting a second message to another component of the monitoring system, the second message comprising information indicating that the unattended service provider entered the second, different portion that is different than the first portion of the property.

16. The method of claim 14,
wherein the first portion of the property is defined using one or more boundaries,
wherein determining, based on the obtained image data, that the unattended service provider has entered into the second, different portion of the property than the first portion of the property that is associated with the particular type of unattended service comprises:
determining, based on the obtained image data, whether the service provider has crossed the one or more of the boundaries, and
wherein in response to determining, based on the obtained image data, that the service provider entered into the second, different portion of the property other than the first portion of the property that is associated with the particular type of unattended service, triggering an alarm event comprises:
in response to determining, based on the obtained image data, that the unattended service provider has crossed the one or more boundaries, triggering an alarm event.

17. The method of claim 16, wherein the one or more boundaries define a path from an entrance of the property to a particular location within the property that is associated with the particular type of unattended service.

18. The method of claim 14,
wherein configuring the monitoring system to allow access to the first portion of the property associated with the particular type of unattended service without triggering an alarm event comprises:

identifying one or more sensors that are used by the monitoring system to monitor the first portion of the property associated with the particular type of unattended service; and configuring the monitoring system to disregard sensor data generated by the one or more sensors of the monitoring system that are configured to monitor the first portion of the property associated with the particular type of unattended service for a predetermined amount of time.

19. The method of claim 14, wherein configuring the monitoring system to allow access to the first portion of the property associated with the particular type of unattended service without triggering an alarm event comprises:

identifying one or more doors of the property that need to be unlocked to facilitate access to the first portion of the property associated with the particular type of unattended service; and instructing the identified one or more doors to unlock or open without triggering an alarm event.

20. A non-transitory computer-readable medium storing software comprising instructions executable by one or more computers which, upon such execution, cause the one or more computers to perform operations comprising:

receiving a request to enter the property to perform the unattended service;

determining, based on the received request, a particular type of unattended service;

accessing a stored service profile based on the particular type of unattended service, wherein the service profile indicates that the particular type of unattended service permits access to a first portion of the property;

based on the stored service profile, configuring the monitoring system to allow access to the first portion of the property associated with the particular type of unattended service without triggering an alarm event;

obtaining image data of the property after the monitoring system is configured to allow access to the first portion of the property associated with the particular type of unattended service;

determining, based on the obtained image data, that an unattended service provider has entered into a second, different portion of the property other than the first portion of the property that is associated with the particular type of unattended service; and in response to determining, based on the obtained image data, that the service provider entered into the second, different portion of the property other than the first portion of the property that is associated with the particular type of unattended service, triggering an alarm event.

* * * * *

UNITED STATES PATENT AND TRADEMARK OFFICE
CERTIFICATE OF CORRECTION

PATENT NO.        : 10,748,362 B2
APPLICATION NO.   : 16/371941
DATED             : August 18, 2020
INVENTOR(S)       : Stephen Scott Trundle and Aaron Lee Roberts Page 1 of 1

It is certified that error appears in the above-identified patent and that said Letters Patent is hereby corrected as shown below:

On the Title Page

Item (60), add:
-- Related U.S. Application Data Provisional Application No. 62/651,068, filed on Mar. 30, 2018. --

Signed and Sealed this
Sixth Day of October, 2020

Andrei Iancu
*Director of the United States Patent and Trademark Office*